United States Patent
Weiny et al.

(10) Patent No.: US 10,411,980 B2
(45) Date of Patent: Sep. 10, 2019

(54) PROACTIVE PATH QUALITY REPORTING IN PACKET TRANSMISSION

(71) Applicant: Intel Corporation, Santa Clara, CA (US)

(72) Inventors: Ira Weiny, Livermore, CA (US); Douglas S Oucharek, Naramata (CA)

(73) Assignee: Intel Corporation, Santa Clara, CA (US)

(*) Notice: Subject to any disclaimer, the term of this patent is extended or adjusted under 35 U.S.C. 154(b) by 89 days.

(21) Appl. No.: 15/270,671

(22) Filed: Sep. 20, 2016

(65) Prior Publication Data

US 2018/0083855 A1    Mar. 22, 2018

(51) Int. Cl.
*H04L 12/26* (2006.01)
*H04L 12/24* (2006.01)

(52) U.S. Cl.
CPC ...... *H04L 43/0823* (2013.01); *H04L 41/0668* (2013.01); *H04L 43/087* (2013.01)

(58) Field of Classification Search
None
See application file for complete search history.

(56) References Cited

U.S. PATENT DOCUMENTS

| 5,007,047 A * | 4/1991 | Sridhar | H04B 3/235 370/286 |
|---|---|---|---|
| 7,898,948 B2 * | 3/2011 | DiGirolamo | H04L 1/0026 370/230 |
| 2008/0310340 A1 * | 12/2008 | Isozu | H04L 45/10 370/328 |
| 2013/0003524 A1 * | 1/2013 | Huang | H04L 1/1825 370/216 |
| 2013/0086267 A1 * | 4/2013 | Gelenbe | H04L 45/302 709/225 |
| 2014/0133292 A1 * | 5/2014 | Yamatsu | H04L 45/18 370/228 |
| 2014/0241182 A1 * | 8/2014 | Smadi | H04W 36/20 370/252 |
| 2015/0334026 A1 * | 11/2015 | Hadavi | H04L 47/24 370/235 |
| 2016/0223702 A1 * | 8/2016 | Hou | G01V 3/28 |

* cited by examiner

*Primary Examiner* — Viet D Vu
*Assistant Examiner* — James A Edwards
(74) *Attorney, Agent, or Firm* — Schwegman Lundberg & Woessner, P.A.

(57) ABSTRACT

An originated packet is to be forward-propagated along a path to a destination device, with the path including one or more intermediary node devices. A path quality indication representing a reported error having been detected by at least one of the intermediary node devices residing along the path, is incorporated in the forward-propagating packet. The destination device incorporates the path quality indication in an acknowledgement packet directed to the originator of the packet.

20 Claims, 7 Drawing Sheets

PROACTIVE PATH QUALITY REPORTING IN PACKET TRANSMISSION

TECHNICAL FIELD

Aspects of the disclosure relate generally to information processing and communications and, more particularly, to network routing and path selection.

BACKGROUND

In high-speed networking, data throughput and low latency are key objectives for system designers. Oftentimes, networking equipment, such as switches, routers, and other node devices, are pushed to their physical limit to attain networking performance goals. As a consequence, certain links may become prone to errors. Errors may be managed using data-encoding techniques such as forward error correction, for example, where a receiving node or intermediate-hop node detects and, sometimes even corrects, errors in received data. Errors that cannot be corrected generally result in a negative acknowledgement (NACK) reported to the sending node, which responds by retransmitting the packet. Retransmissions tend to reduce data throughput, increase latency, and contribute to congestion at affected portions of the network.

Conventionally, networks manage congestion by dropping packets, or otherwise calling for, or creating conditions in which, packets are re-routed using other available paths that are less congested. One challenge with this type of approach is that, by the time a link is deemed congested, there has already been some period of time during which the data-throughput performance of the network suffered a reduced level of data-throughput performance.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1A:
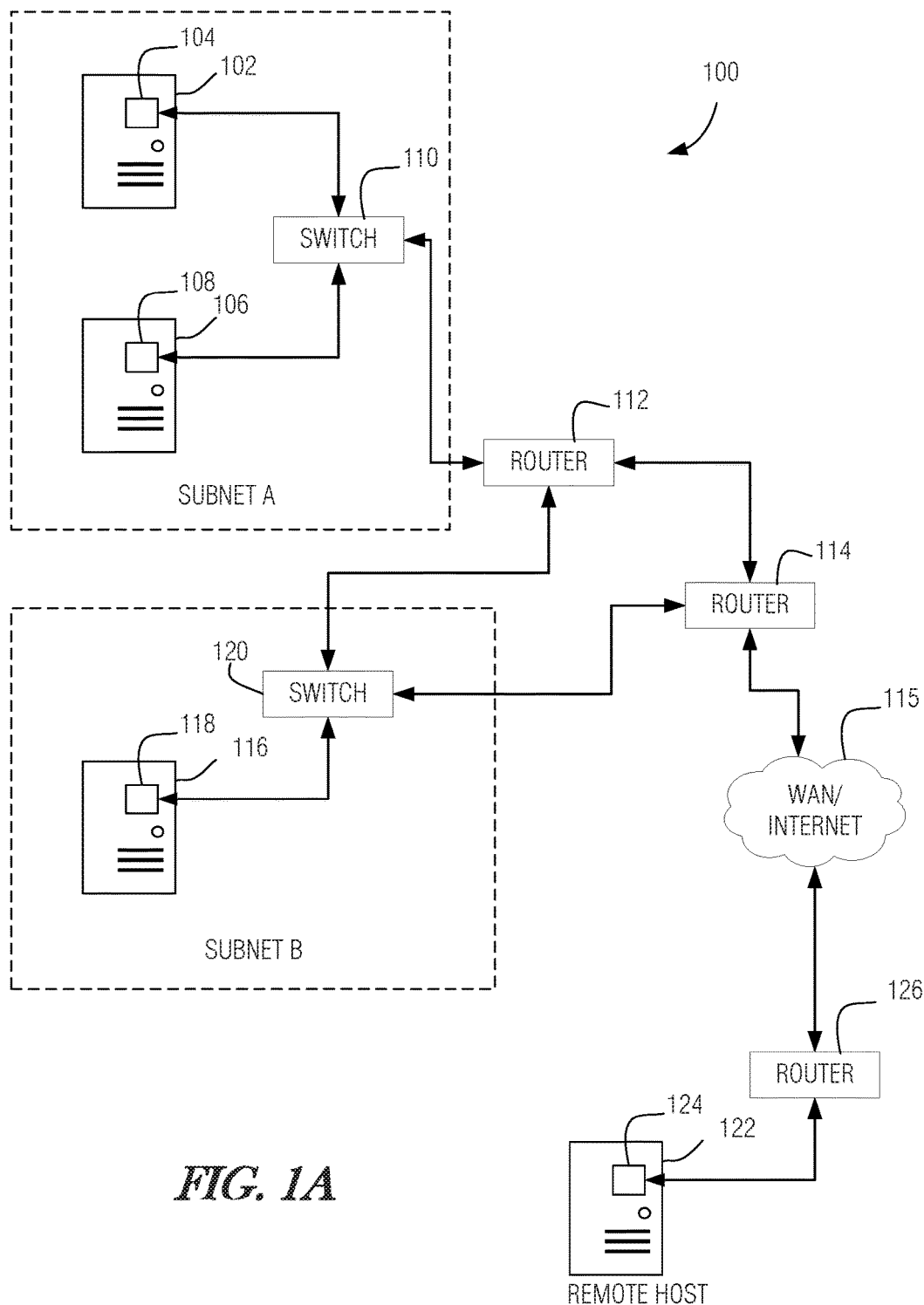
FIG. 1A is a block diagram illustrating a portion of a computer network in which aspects of the disclosure may be employed, and portions of which may constitute embodiments.

FIG. 1A is a block diagram illustrating a portion of a general computer network 100 in which aspects of the disclosure may be employed, and portions of which may constitute embodiments as will be described in greater detail below. Computer network 100 includes various host machines 102, 106, 116, and 122, as depicted, which are communicatively coupled with one another via one or more transmission media. Host machines 102, 106, 116, and 122 may be general-purpose computer systems, specialized computer system components, such as processing units, memory units, peripherals, storage devices, and the like. The term "transmission medium" shall be taken to include any tangible or intangible medium that is capable of storing, encoding, or carrying instructions for execution by the machine, and includes digital or analog communications signals or other intangible medium to facilitate communication of such software. Examples of transmission media include copper wire, fiber optic cabling, wireless transmission channels, and the like.

As a generally richly-featured example, a host machine's architecture (in the example case where a host machine is a general-purpose computer system) is described below with reference to FIG. 2. It will be understood that different subsets of the system described with reference to FIG. 2, or a system with an altogether different architecture, may be used to realize a host machine according to one or more embodiments described herein.

For the sake of simplicity in the networked context illustrated in FIG. 1A, each host machine 102, 106, 116, and 122 includes a network interface device (NID) 104, 108, 118, and 124, respectively. Network 100 is arranged such that host machines 102 and 106 are organized in subnet A with switch 110, and host machine 116 is part of subnet B having switch 120. Switches 110 and 120 are each coupled to local network router 112, which in turn is coupled to wide-area network router 114, which provides connectivity to wide-area network 115, which may be the Internet according to one embodiment, or a proprietary wide-area network according to another embodiment. In a related embodiment, switches 110, 120 may each be coupled to wide-area network router 114 directly. As illustrated, switch 120 is coupled to wide-area network router 114. Remote host 122 is coupled to wide-area network 115 via router 126 as shown.

In one example, host machine 102, which is also referred to herein as local host machine 102, is programmed or otherwise commanded under program control, to transact with remote host 122.

It will be understood that communications may be delivered across network 100 as transactions, or segments, which may be handled as packets, which in turn may be handled as frames of bits. A hierarchical handling of the transmission may be implemented, with different processes carried out by the various nodes along the transmission path(s) on corresponding portions of the data of each transaction.

A variety of network topologies in which aspects of the embodiments may be embodied are contemplated including, for instance, peer-to-peer topologies, mesh topologies, switched-fabric topologies, cluster topologies, and the like. In various example embodiments, an Infiniband or Omni-Path switched-fabric network is employed.

Figure 1B:
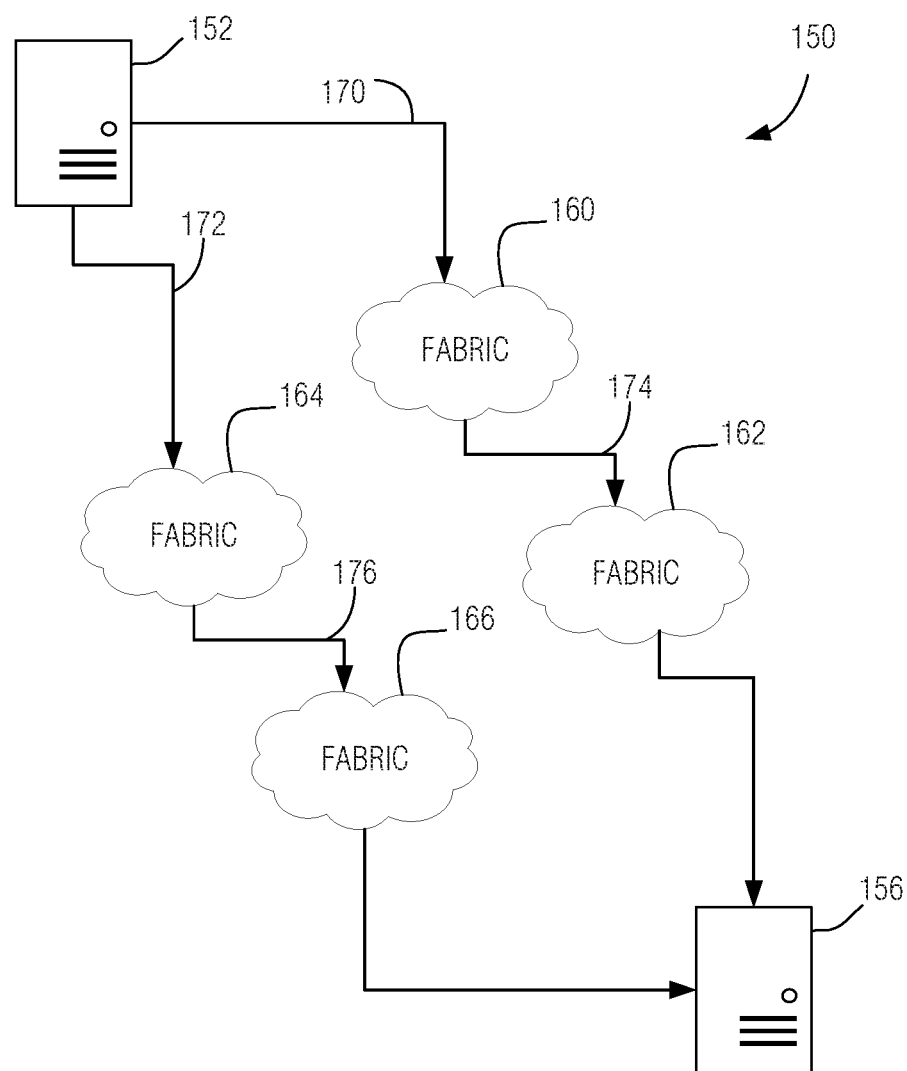
FIG. 1B is a diagram illustrating a switched-fabric network topology in which aspects of the disclosure may be employed.

FIG. 1B is a diagram illustrating an example portion of a switched-fabric network 150 in which certain embodiments may be implemented. Host machine 152 communicates with host machine 156 over fabrics 160 and 162 as a first path 170, and over fabrics 164 and 166 as a second path 172. Each fabric 160-166 may include crossbar switches, controllers, and other network nodes or components that provide high-speed, low-latency packet routing. As depicted, host machine 152 is a source node for data transmission, whereas host machine 156 is a destination node.

In an embodiment, source-node host machine 152 may select from among paths 170 and 172 for each packet to be transmitted. In another embodiment, host machine 152 may employ a dispersive routing technique in which multiple addresses are assigned to destination-node host machine 156, and where the fabrics 160-166 may associate each of those addresses with different routes. Accordingly, source-node host machine 152 may utilize one or more techniques for varying the path that a given packet to be transmitted is to take. Notably, source-node host machine 152 may lack the ability to define specific routes that a packet is to follow within any of the fabrics, relying instead on defined routes associated with the destination address. These defined routes may be static or dynamic, depending on the implementation of the fabric(s).

Figure 2:
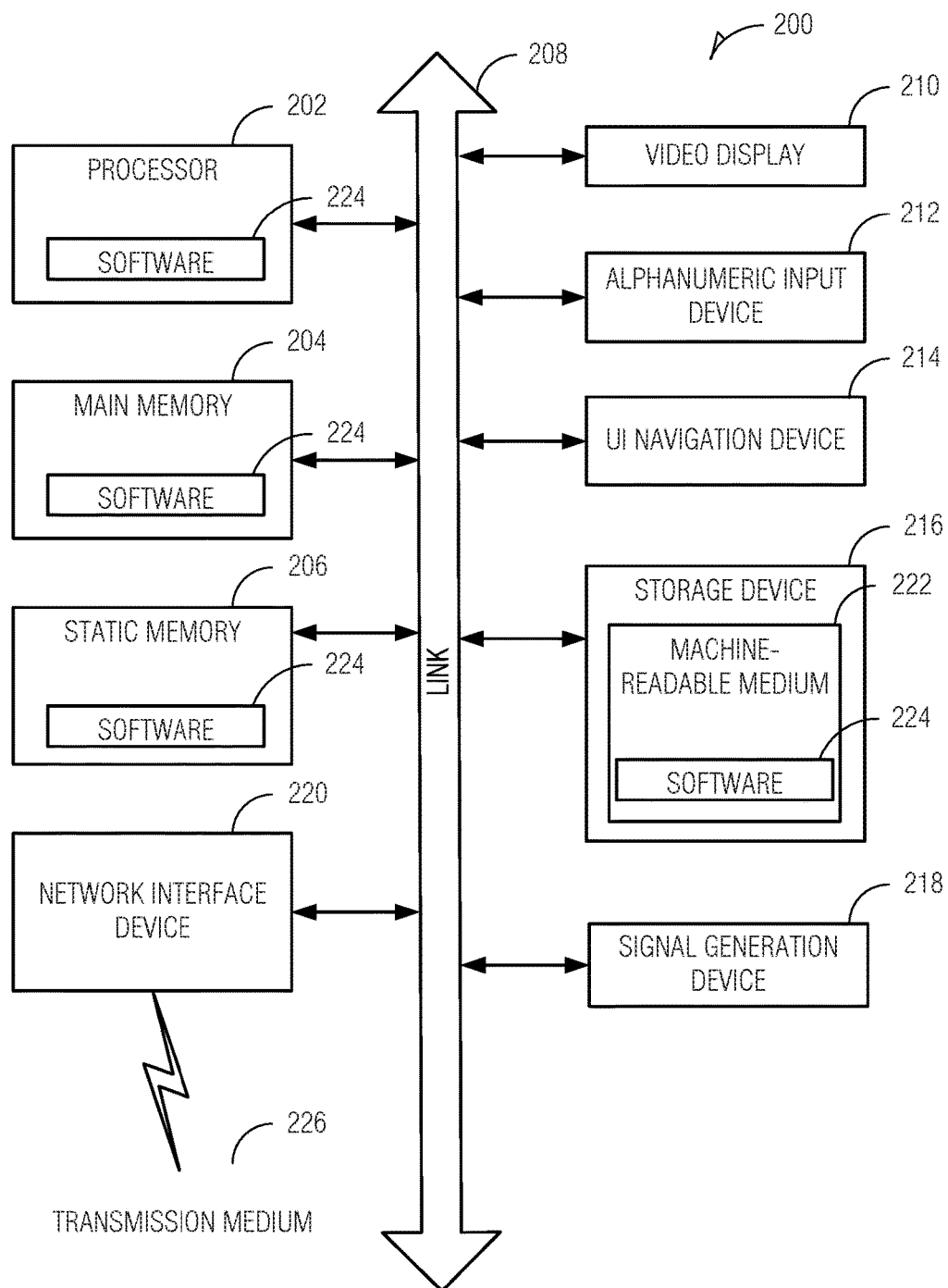
FIG. 2 is a block diagram illustrating a host machine with a network interface device according to embodiments.

FIG. 2 is a block diagram illustrating a host machine in the example form of a general-purpose computer system 200. In certain embodiments, programming of the computer system 200 according to one or more particular algorithms produces a special-purpose machine upon execution of that programming. In a networked deployment, the host machine may operate in the capacity of either a server or a client machine in server-client network environments, or it may act as a peer machine in peer-to-peer (or distributed) network environments. The host machine may take any suitable form factor, such as a personal computer (PC) workstation, a server, whether rack-mounted, or stand-alone, a mainframe computer, a cluster computing system, or the like, a set-top box, as well as a mobile or portable computing system, such as a laptop/notebook PC, an onboard vehicle system, wearable device, a tablet PC, a hybrid tablet, a personal digital assistant (PDA), a mobile telephone, an Internet of Things (IoT) device or, more generally, any machine capable of executing instructions (sequential or otherwise) that specify actions to be taken by that machine.

Example host machine 200 includes at least one processor 202 (e.g., a central processing unit (CPU), a graphics processing unit (GPU) or both, processor cores, compute nodes, etc.), a main memory 204 and a static memory 206, which communicate with each other via a link 208 (e.g., bus). The host machine 200 may further include a video display unit 210, an alphanumeric input device 212 (e.g., a keyboard), and a user interface (UI) navigation device 214 (e.g., a mouse). In one embodiment, the video display unit 210, input device 212 and UI navigation device 214 are incorporated into a touch screen display. The host machine 200 may additionally include a storage device 216 (e.g., a drive unit), a signal generation device 218 (e.g., a speaker), a network interface device (NID) 220, and one or more sensors (not shown), such as a global positioning system (GPS) sensor, compass, accelerometer, or other sensor.

The storage device 216 includes a machine-readable medium 222 on which is stored one or more sets of data structures and instructions 224 (e.g., software) embodying or utilized by any one or more of the methodologies or functions described herein. The instructions 224 may also reside, completely or at least partially, within the main memory 204, static memory 206, and/or within the processor 202 during execution thereof by the host machine 200, with the main memory 204, static memory 206, and the processor 202 also constituting machine-readable media.

While the machine-readable medium 222 is illustrated in an example embodiment to be a single medium, the term "machine-readable medium" may include a single medium or multiple media (e.g., a centralized or distributed database, and/or associated caches and servers) that store the one or more instructions 224. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices (e.g., solid-state drive, removable memory card, USB-drive, integrated flash device on a motherboard, etc.); magnetic disks such as internal hard disks and removable disks; magneto-optical disks; and CD-ROM and DVD-ROM disks.

NID 220 according to various embodiments may take any suitable form factor. In one such embodiment, NID 220 is in the form of a network interface card (NIC) or host-fabric interface (HFI) that interfaces with processor 202 via link 208. In one example, link 208 includes a PCI Express (PCIe) bus, including a slot into which the NIC form-factor may removably engage. In another embodiment, NID 220 is a network interface circuit laid out on a motherboard together with local link circuitry, processor interface circuitry, other input/output circuitry, memory circuitry, storage device and peripheral controller circuitry, and the like. In another embodiment, NID 220 is a peripheral that interfaces with link 208 via a peripheral input/output port such as a universal serial bus (USB) port. In various embodiments, a system may have one NID, or two or more NIDs to provide multiple transmission paths to and from the system. In a related embodiment, one or more NIDs may be incorporated in processor 202.

One aspect of the embodiments is directed to a fast (e.g., near-real-time) and unobtrusive (e.g., lightweight) determination of the quality of paths used for sending packets from source to destination. In an embodiment, the destination, and intermediary devices situated along a path taken by a packet cooperate to inform the source device about the path quality. In a related embodiment, the packet itself it used to carry forward to the destination information reporting any errors experienced along its path. The automatic repeat request (ARQ)-related messaging, such as e.g., acknowledgement (ACK) and non-acknowledgement (NACK) packets, are in turn used to relay the error-reporting information to the source device.

In a related embodiment, the source device gathers statistical information over time for the destination device (and for other destination devices), to determine a path quality score associated with each path. Notably, the source device has some ability to initiate, or to perform, path selection, whether using different ports associated with distinct parallel paths, dispersive routing techniques, source routing (e.g., full-path or partial), or other suitable technique, such as requesting a centralized manager of a network fabric to institute a routing change in the fabric.

Advantageously, embodiments of the disclosure provide visibility as to the path quality to applications running on the source device that utilize the network. The path quality information is distinct from congestion-related state information in a number of ways. For one, a link along the path of the packets sent to the destination may be experiencing errors, but in the absence of a large volume of traffic, the link may not be experiencing any congestion. Still, the source device benefits from knowing about the path quality because in high-traffic situations the congestion may be exacerbated by poor link quality.

Also, congestion indicia does not necessarily represent a low-quality path; congestion may be present in situations where a particular link is experiencing high traffic flows. Moreover, deteriorating path quality is indicative of a likelihood of link failure. Knowing the path quality permits the source device, and the applications running on it, to proactively change paths before any congestion- or link-failure-related problems arise that may adversely impact the communication performance over the network. This may be particularly beneficial in networks where re-establishing a lost link is resource-intensive, which may result in unacceptable latency for performance-sensitive applications.

Additionally, the lightweight nature of the solution according to some embodiments avoids the exchange of extraneous "health packets" to provide insight into the path quality. Furthermore, embodiments of the disclosure may avoid having to conduct deep packet inspection, such as having intermediary nodes read the content of the packet payloads to obtain the path quality information. To this end, in some embodiments, one or more bits of the packet header are assigned to represent a packet-specific path-quality performance measure.

Figure 3:
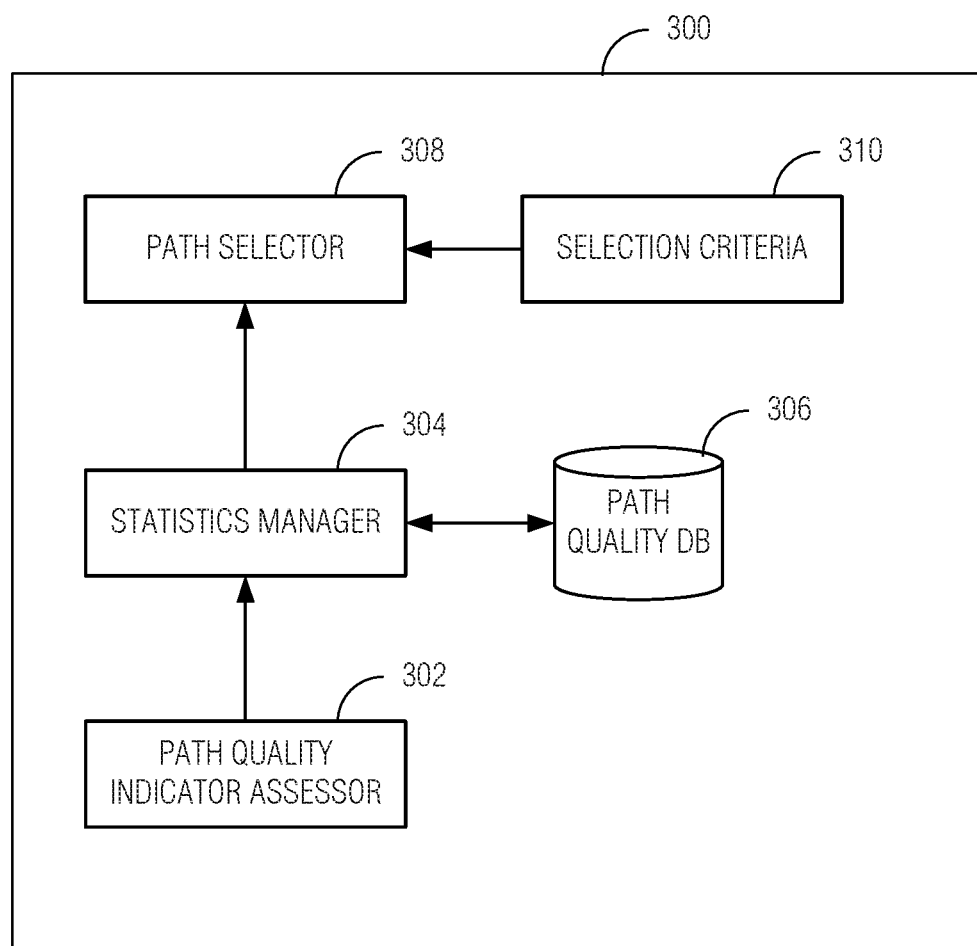
FIG. 3 is a block diagram illustrating certain components of source node that obtains, and responds to, path quality indicia according to an example embodiment.

FIG. 3 is a block diagram illustrating certain components of source node 300 that obtains, and responds to, path quality indicia according to an example embodiment. Path quality indicator assessor 302 is constructed, programmed, or otherwise configured, to read incoming ACK or NACK packets sent by the destination device to obtain a path quality measure contained in that packet. In one example, the path quality measure may simply be a binary indicator of an error having been detected (e.g., exceeding a defined threshold) in the path of the outgoing packet addressed to the destination device, the receipt of which is responded to by the ACK or NACK packet. In other embodiments, the path quality measure may have a graded value corresponding to the quantity, degree, or severity, of error(s) encountered along the path taken by the corresponding packet delivered to the destination, or measured by an intermediary device along the path based on error experienced in the transmission of one or more prior packets. For instance, the path quality indicator may be a counter that is incremented each time an error is detected by an intermediary device along the path, that exceeds a defined threshold.

Notably, the path quality indicator may be set or incremented in a given packet even when that particular packet experienced no errors; in this case, the cause for setting or incrementing the path quality indicator may be a known problem with link quality (which may be intermittent)—as known by an intermediary device along the path of the packet. In a related embodiment, the intermediary device logs the occurrences of errors (or other monitored events impacting the path quality), with timestamps. A backwards-facing time window may be defined, in which there may have been errors or other adverse events in the transmission of prior packets. The intermediary device may set or increment the path quality indicator in response to the adverse events. In some embodiments, a scoring threshold or other path quality-based condition is applied by the intermediary device to determine whether a current packet being forwarded to its destination should be marked with a path-quality indicator.

Statistics manager 304 stores path quality assessments in path quality database 306. Path quality database 306 maintains records that associate path quality information with an indicator of the corresponding path. For instance, the path indicator may include the destination device's address, along with any path-selection information used by the source device to send a packet to the destination. Also, the records may include a timestamp.

Statistics manager 304 is constructed, programmed, or otherwise configured, to compute aggregated statistics of the path quality measures. Statistics manager 304 may compute a path quality score as a function of time, such as a running average, for example, with relatively greater weight given to more recent path quality measures compared to older ones.

Path selector 308 is constructed, programmed, or otherwise configured, to respond to the path quality score by selecting a path for subsequent packets to be sent to the same destination. The path selection is based on selection criteria 310, which may define a path-quality threshold below which the path quality is deemed sufficiently low to give rise to a call for switching paths. In a related embodiment, the path-quality threshold is dynamic, i.e., variable over time, such as, for example, based on a prior path quality score corresponding to one or more alternative paths that may be selected. In one example use case, the path-quality threshold may be set to the highest path quality score among the alternative paths and, if the current quality score is less than the prior one, path selector 308 selects the higher-scoring path. In various embodiments, path selector 308 may include components residing at the application, drivers, or some combination thereof.

Figure 4:
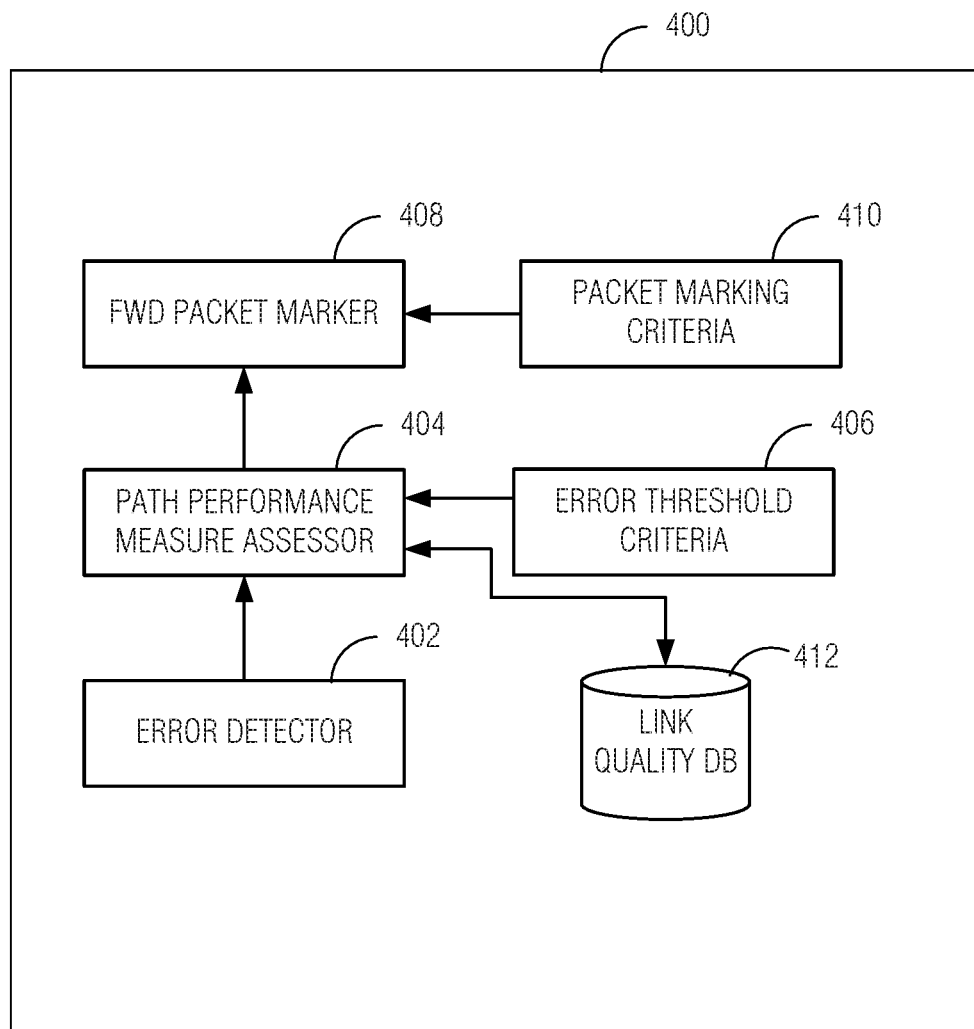
FIG. 4 is a block diagram illustrating certain components of an intermediary node along a path of a packet according to an example embodiment.

FIG. 4 is a block diagram illustrating certain components of an intermediary node along a path of a packet according to an example embodiment. The intermediary node may be a switch, router, gateway or endpoint device in a multi-hop network according to various embodiments. Error detector 402 is constructed, programmed, or otherwise configured, to sense the occurrence of an error. Generally speaking, an error may be defined as an imperfection in the transmission of a packet over a local link, regardless as to whether or not the packet was ultimately successfully transmitted over that link, distinct from congestion of the link. In various embodiments, a variety of events may be defined as errors. For example, re-transmissions of frames at the link layer, error recovery using forward error correction (FEC) decoding, buffering of incomplete or un-decoded frames according hybrid ARQ (HARQ) techniques, loss of one or more lanes in parallel-lane-connectivity networks, or the like.

Path performance measure assessor 404 is constructed, programmed, or otherwise configured, to make a quantitative assessment of the detected error, and to compare that assessment against error threshold criteria 406. The operation of path performance measure assessor 404 is to apply a threshold to the severity of the error such that only significant errors (i.e., those meeting or exceeding the threshold) are reported as such. Errors falling below the error threshold criteria may be disregarded according to an example.

In a related embodiment, the error threshold criteria is variable. For instance, it may be adjusted by a centralized manager of the network fabric for error reporting to be more or less sensitive depending on the expected performance of the fabric. Thus, for example, for a fabric that is constantly operated at its designed maximum throughput and data rate, it may be acceptable to encounter errors with some regularity; accordingly, the error threshold criteria may be set high, such that only a severe error is to be reported. In a related embodiment, the error threshold criteria may be adjusted dynamically based on a current level of congestion such that greater congestion causes the path quality criteria to be made more selective (i.e., less sensitive).

Forward packet marker 408 is constructed, programmed, or otherwise configured, to update the packet header to indicate the path quality, in response to the path performance measure assessor 404 output, prior to sending a current packet to its destination or next hop towards its destination. In one embodiment, forward packet marker 408 first examines the packet header to determine if the path quality indicator is already set, or set to a particular value. Forward packet marker 408 then determines whether the path quality indicator is to be updated. Packet marking criteria 410 defines the rules for setting or updating the path quality indicator. In one example, if an assessed severity of a current error is less than an indicated severity of an error previously set in the packet header, packet marking criteria 410 may call for making no change to the preexisting value of the path quality indicator.

Notably, in various embodiments, the current packet may be marked with a path quality indicator based on a current error detected by error detector 402 in the course of propagating the current packet towards its destination, or based on a previous error detected in the course of propagating one or more preceding packets along the same path as the one taken by the current packet. Therefore, a current packet may be marked with an adverse path quality indication even though the current packet did not experience an error. Rather, in these embodiments, the link may have been determined to be degraded to some extent by path performance measure assessor 404 and, consequently, all packets passing through the link are stochastically subject to errors. Hence, an intermediary node that knows itself to be degraded by virtue of having measured prior packet errors, marks subsequent packets to indicate the degradation. Error threshold criteria 406 may include a probabilistic threshold such as, for instance, if 20% or more of all packets experience an error, the error determination is to be triggered.

In a related embodiment, link quality database 412 includes records representing a history log, or statistical summary, of errors associated with each input port, output port, or both. The ports correspond to links to one or more neighboring devices that may form branches of paths that include the intermediary node device. Each record in link quality database 412 may also include a timestamp so that the freshness of the error occurrences may be taken into account. For example, a time windowing filter may be applied that excludes packet errors that are older than a given time value from consideration for the assessment of path performance. In a related embodiment, a discount function is applied to reduce a prior error's severity indication as a function of its aging, such that more recent errors are given greater weight by path performance measure assessor 404.

Figure 5:
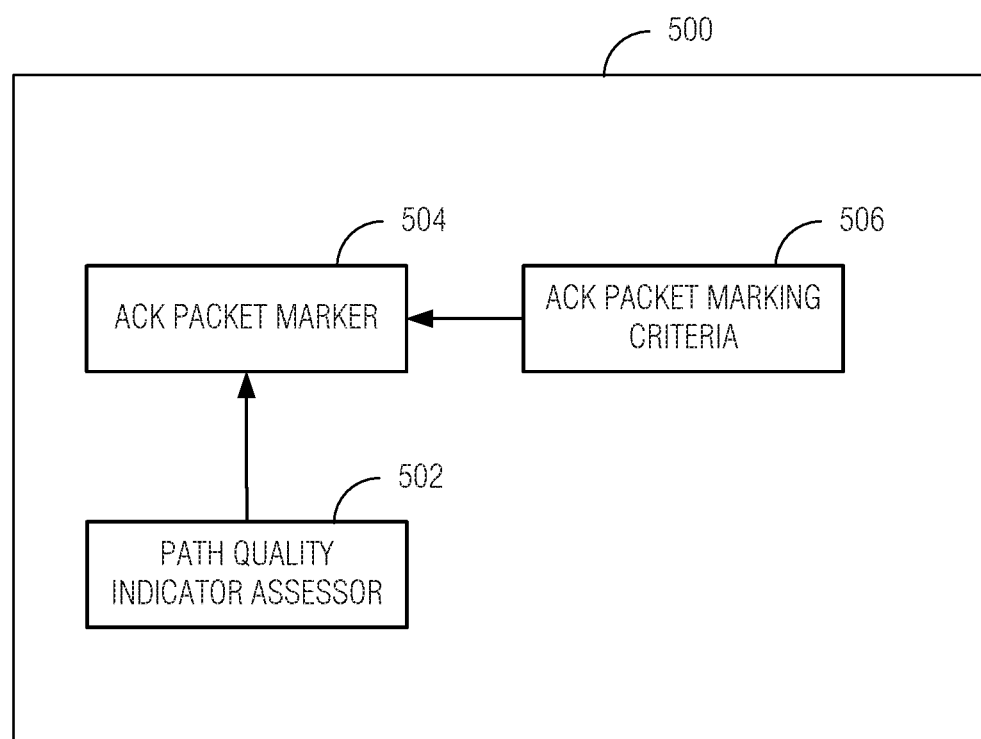
FIG. 5 is a block diagram illustrating certain components of a destination device according to an example embodiment.

FIG. 5 is a block diagram illustrating certain components of a destination device according to an example embodiment. Path quality indicator assessor 502 is constructed, programmed, or otherwise configured, to read the header of incoming packets to obtain the value of the path quality indicator. The path quality indicator received in the forward-directed packet is copied to an ACK packet by ACK packet marker 504, based on ACK packet marking criteria 506. In a related embodiment, ACK packet marker 504 is further constructed, programmed, or otherwise configured, to modify the path quality indicator according to ACK packet marking criteria 506. For instance, in an example embodiment where there are fewer bits available in the ACK packet for the path quality indication, ACK packet marker may round the value of path quality measure indicated in the received forward-directed packet, to be represented by the available bits in the ACK packet. In a particular example case where a single binary bit is available in the ACK packet for the path quality indicator, the value of the path quality measure may be compared against a defined threshold to achieve the rounding result.

In various embodiments, the components described above with reference to FIGS. 3-5 are implemented as engines, circuits, components, or modules, which for the sake of consistency are termed engines, although it will be understood that these terms may be used interchangeably. Engines may be hardware, software, or firmware communicatively coupled to one or more processors in order to carry out the operations described herein. Engines may be hardware engines, and as such engines may be considered tangible entities capable of performing specified operations and may be configured or arranged in a certain manner. In an example, circuits may be arranged (e.g., internally or with respect to external entities such as other circuits) in a specified manner as an engine. In an example, the whole or part of one or more hardware processors may be configured by firmware or software (e.g., instructions, an application portion, or an application) as an engine that operates to perform specified operations. In an example, the software may reside on a machine-readable medium. In an example, the software, when executed by the underlying hardware of the engine, causes the hardware to perform the specified operations. Accordingly, the term hardware engine is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein.

Considering examples in which engines are temporarily configured, each of the engines need not be instantiated at any one moment in time. For example, where the engines comprise a general-purpose hardware processor core configured using software; the general-purpose hardware processor core may be configured as respective different engines at different times. Software may accordingly configure a hardware processor core, for example, to constitute a particular engine at one instance of time and to constitute a different engine at a different instance of time.

Figure 6:
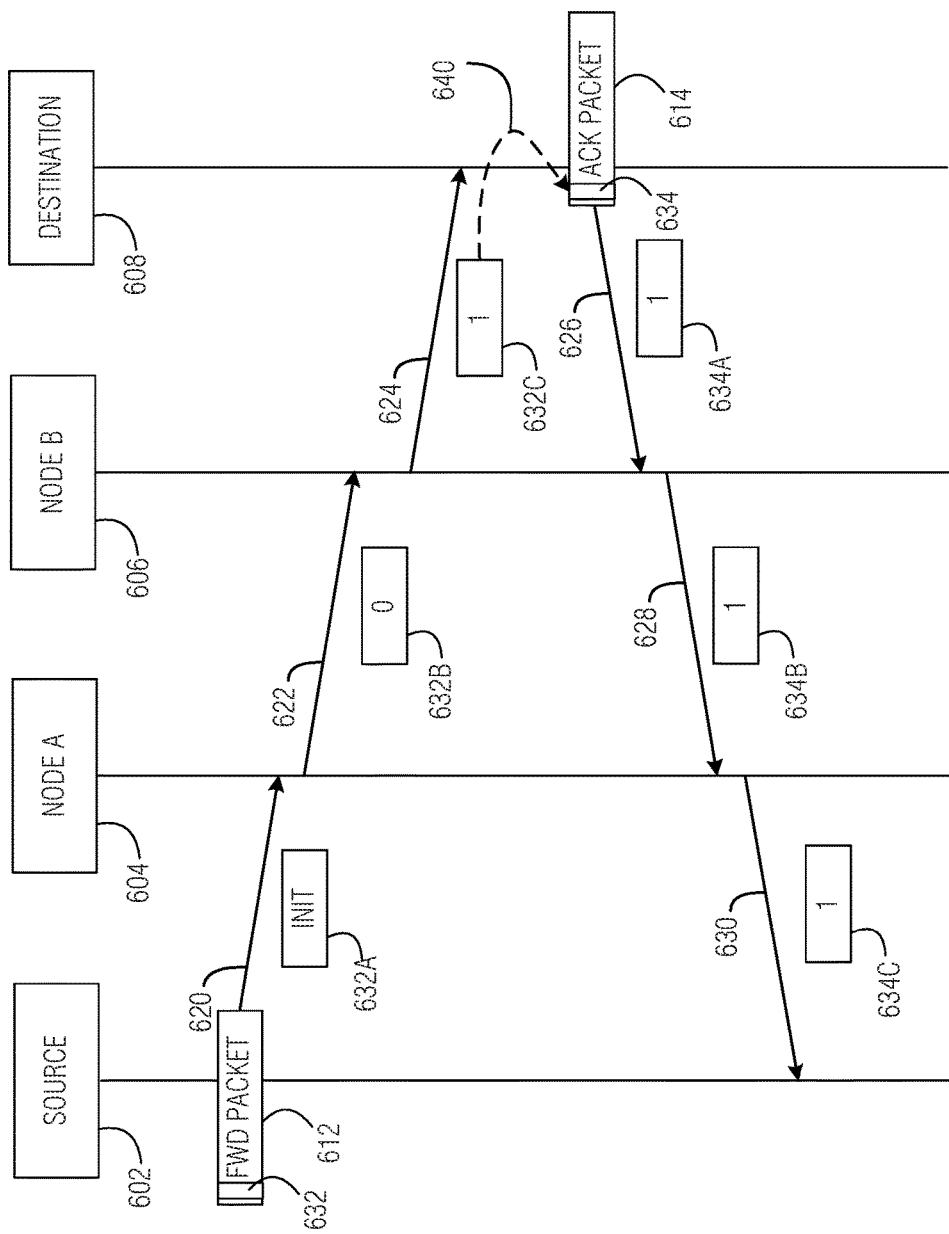
FIG. 6 is an information flow diagram illustrating a method of operation of source device, a destination device, and intermediate devices that constitute at least a portion of a path between the source and destination devices, according to an example embodiment.

FIG. 6 is an information flow diagram illustrating a method of operation of source device 602, destination device 608, and intermediate devices identified as Node A 604 and Node B 608 that constitute at least a portion of a path between source device 602 and destination device 608, according to an example embodiment. Source device 602 generates a forward-directed packet 612 addressed to destination device 608. The forward-directed packet 612 includes a header and a body. Among other information, the header includes path quality indicator 632.

At transmission 620, the forward-directed packet 612 is transmitted to Node A 604. At this stage, path quality indicator 632 is initialized, as indicated at 632A. The initialized value may be indicative of no error (i.e., "0"), or it may be some other value representing the initialized state (e.g., "INIT"). Upon reception of transmission 620, Node A 604 checks for any errors. These may be identified, for example, by recovery of errors in the data using FEC, detection of errors in the data using another type of parity checks or cyclical redundancy checking (CRC), link-layer retries, loss of lane, or the like. In this example, no errors were detected; accordingly, path quality indicator 632 may be updated to reflect an error-free link, as indicated at 632B with a value of "0." Transmission 622 of forward-directed packet 612 to Node B 608 contains path quality indicator value 632B.

Assuming the link between Node A 604 and Node B 606 has an error in the present example, Node B 606, detects the error and, in some embodiments, assesses the path performance by determining a severity level of the error. In one example, the severity level may be based on a number of retries, on a number of corrected bits by operation of FEC, or other measurable parameter. Accordingly, path quality indicator 632 is updated to reflect the error, as indicated at 632C with a value of "1."

The updated forward-directed packet is then transmitted to destination device 608 via transmission 624. Destination device 608 reads the path quality indicator 632C, and optionally assesses its severity or impact on its operations. Also, in some embodiments, destination device 608 also performs error detection and assessment for the link between Node B 606 and destination device 608, and may further revise the path quality indicator based on the result of this assessment.

Destination device 608 forms ACK packet 614, containing path quality indicator 634. As indicated at 640, destination device 608 bases the value of path quality indicator 634 on received path quality indicator value 632C. In one such embodiment, path quality indicator value 632C is simply copied over to path quality indicator 634 of ACK packet 614. ACK packet 614 is addressed to source device 602, and is routed via Node B 606 and Node A 604 to source device 602 via transmissions 626, 628, and 630 as illustrated. Path quality indicator 634 is not updated in the ACK packet propagation path. Accordingly, for each hop, path quality indicators 634A, 634B, and 634C are not updated. Rather, their value is simply carried to source device 62 with each hop.

Upon receipt of ACK packet 614, source device 602 assesses the path quality, logs the path quality indicator value, computes statistics based on multiple path quality indicators from multiple packets associated with the path, and selects a path for future transmissions to destination device 608, consistent with the embodiments discussed above, for example.

In a related embodiment, source device 602 does not perform path selection after receiving an ACK for each and every transmitted packet. Rather, source device 602 may periodically, or in response to a triggering event, perform a path re-assessment in which the statistics representing path quality over a large number of packets, or over some significant period of time, are computed. This practical approach tends to limit the overhead associated with establishing new links along a newly-selected path.

In another related embodiment, source device 602 responds to path quality assessment by interacting with a centralized manager device, such as a centralized manager of a fabric, for instance. As an example operation, an assessment of path quality degradation by source device 602 may give rise to more in-depth network performance analysis by the centralized manager, which may result in an update to the routing tables, or in the institution, or rescission, of adaptive routing, for example. Likewise, the central manager may adjust the error-detection or path-quality reporting criteria in response to a re-evaluation of the performance of a particular cluster of the network.

In another type of network embodiment, a peer-peer gossip protocol for disseminating health-related information may be utilized. For instance, each intermediary device may use a broadcast communication, or flooding communication mechanism, to share its knowledge regarding the path quality to other nodes in the network. This type of embodiment may be utilized in a decentralized, distributed-managed network.

ADDITIONAL NOTES & EXAMPLES

Example 1 is a network node device apparatus, the apparatus comprising: processing hardware interfaced with a network interface device, the processing hardware to: originate a packet to be forward-propagated along a path to a destination device, the path including one or more intermediary node devices; receive, via the network interface device, a path quality indication in an acknowledgement packet, the path quality indication representing a reported error having been detected by at least one of the intermediary node devices residing along the path, the reported error having been incorporated in the forward-propagating packet by the at least one intermediary device, received by the destination device, and incorporated in the acknowledgement packet directed to the network node device; and in response to the path quality indication, initiate a path selection operation to adjust the path to be taken by future packets sourced by the network node device and directed to the destination device.

In Example 2, the subject matter of Example 1 optionally includes wherein the path quality indication represents a reported error having been previously detected by the at least one of the intermediary node devices in propagating one or more preceding packets along the path.

In Example 3, the subject matter of any one or more of Examples 1-2 optionally include wherein the path quality indication represents a reported error having been detected by the at least one of the intermediary node devices in propagating the packet along the path.

In Example 4, the subject matter of any one or more of Examples 1-3 optionally include wherein the path quality indication is in a header of the forward-propagating packet.

In Example 5, the subject matter of any one or more of Examples 1-4 optionally include wherein the path quality indication is in a header of the acknowledgement packet.

In Example 6, the subject matter of any one or more of Examples 1-5 optionally include wherein the path quality indication is a single-bit binary value.

In Example 7, the subject matter of any one or more of Examples 1-6 optionally include wherein the path quality indication is a graded value corresponding to a severity of the reported error.

In Example 8, the subject matter of any one or more of Examples 1-7 optionally include wherein the path quality indication is a graded value corresponding to a probability of an error.

In Example 9, the subject matter of any one or more of Examples 1-8 optionally include a statistics manager to compute aggregated statistics of a plurality of path quality measures corresponding to respective paths to the destination device.

In Example 10, the subject matter of any one or more of Examples 1-9 optionally include a path quality database to maintain records that associate path quality information with corresponding paths to a plurality of destination devices.

In Example 11, the subject matter of any one or more of Examples 1-10 optionally include a path selector to initiate the path selection; wherein the path selection is made from among a plurality of network fabrics containing paths to the destination device.

In Example 12, the subject matter of any one or more of Examples 1-11 optionally include a path selector to initiate the path selection; wherein the path selection is made using dispersive routing wherein the destination device is addressable using multiple different addresses, each address corresponding to a different path.

In Example 13, the subject matter of any one or more of Examples 1-12 optionally include wherein the reported error represents one or more link-layer retries.

In Example 14, the subject matter of any one or more of Examples 1-13 optionally include wherein the reported error represents recovery of data using forward error-correction decoding.

In Example 15, the subject matter of any one or more of Examples 1-14 optionally include wherein the path selection operation is performed by a centralized manager of a network fabric cluster.

Example 16 is a network node device apparatus, the apparatus comprising: processing hardware interfaced with a network interface device, the processing hardware to: receive a forward-propagating packet originated from a source device, the forward-propagating packet to be further propagated along a path to a destination device; assess a measure of path quality based on at least one detected error in communication of one or more packets along the path; in response to assessment of the measure of path quality, mark the forward-propagating packet with a path quality indication based on the measure of path quality, wherein the path quality indication is to be received by the destination device, and incorporated in an acknowledgement packet directed to the source device.

In Example 17, the subject matter of Example 16 optionally includes wherein the path quality indication represents a reported error having been previously detected by the apparatus in propagating one or more preceding packets along the path.

In Example 18, the subject matter of Examples 16-17 optionally include wherein the path quality indication represents a reported error having been detected by the apparatus in propagating the forward-propagating packet along the path.

In Example 19, the subject matter of any one or more of Examples 16-18 optionally include wherein the path quality indication is in a header of the forward-propagating packet.

In Example 20, the subject matter of any one or more of Examples 16-19 optionally include wherein the path quality indication is in a header of the acknowledgement packet.

In Example 21, the subject matter of any one or more of Examples 16-20 optionally include wherein the path quality indication is a single-bit binary value.

In Example 22, the subject matter of any one or more of Examples 16-21 optionally include wherein the path quality indication is a graded value corresponding to a severity of the at least one detected error.

In Example 23, the subject matter of any one or more of Examples 16-22 optionally include wherein the path quality indication is a graded value corresponding to a probability of an error.

In Example 24, the subject matter of any one or more of Examples 16-23 optionally include a link quality database to maintain records that associate link quality information with corresponding links to neighboring devices.

In Example 25, the subject matter of any one or more of Examples 16-24 optionally include wherein the error represents one or more link-layer retries.

In Example 26, the subject matter of any one or more of Examples 16-25 optionally include wherein the error represents recovery of data using forward error-correction decoding.

Example 27 is a network node device apparatus, the apparatus comprising: processing hardware interfaced with a network interface device, the processing hardware to: receive a packet having been originated by a source device and forward-propagated along a path from the source device to the apparatus, the path including one or more intermediary node devices; the packet including a path quality indication representing a reported error having been detected by at least one of the intermediary node devices residing along the path, the reported error having been incorporated in the forward-propagating packet by the at least one intermediary device, and in response to receipt of the packet, generate an acknowledgement packet directed to the source device, the acknowledgement packet including the path quality indication.

In Example 28, the subject matter of Example 27 optionally includes wherein the path quality indication represents a reported error having been previously detected by the at least one of the intermediary node devices in propagating one or more preceding packets along the path.

In Example 29, the subject matter of any one or more of Examples 27-28 optionally include wherein the path quality indication represents a reported error having been detected by the at least one of the intermediary node devices in propagating the packet along the path.

In Example 30, the subject matter of any one or more of Examples 27-29 optionally include wherein the path quality indication is in a header of the forward-propagating packet.

In Example 31, the subject matter of any one or more of Examples 27-30 optionally include wherein the path quality indication is in a header of the acknowledgement packet.

In Example 32, the subject matter of any one or more of Examples 27-31 optionally include wherein the path quality indication is a single-bit binary value.

In Example 33, the subject matter of any one or more of Examples 27-32 optionally include wherein the path quality indication is a graded value corresponding to a severity of the reported error.

In Example 34, the subject matter of any one or more of Examples 27-33 optionally include wherein the path quality indication is a graded value corresponding to a probability of an error.

In Example 35, the subject matter of any one or more of Examples 27-34 optionally include wherein the reported error represents one or more link-layer retries.

In Example 36, the subject matter of any one or more of Examples 27-35 optionally include wherein the reported error represents recovery of data using forward error-correction decoding.

Example 37 is a machine-implemented method for communicating packets in a network, the method comprising: originating, by a source device, a packet to be forward-propagated along a path to a destination device, the path including one or more intermediary node devices; receiving, by the source device, a path quality indication in an acknowledgement packet, the path quality indication representing a reported error having been detected by at least one of the intermediary node devices residing along the path, the reported error having been incorporated in the forward-propagating packet by the at least one intermediary device, received by the destination device, and incorporated in the acknowledgement packet directed to the source device; and in response to the path quality indication, initiating a path selection operation to adjust the path to be taken by future-sourced packets directed to the destination device.

In Example 38, the subject matter of Example 37 optionally includes wherein the path quality indication represents a reported error having been previously detected by the at least one of the intermediary node devices in propagating one or more preceding packets along the path.

In Example 39, the subject matter of any one or more of Examples 37-38 optionally include wherein the path quality indication represents a reported error having been detected by the at least one of the intermediary node devices in propagating the packet along the path.

In Example 40, the subject matter of any one or more of Examples 37-39 optionally include wherein the path quality indication is in a header of the forward-propagating packet.

In Example 41, the subject matter of any one or more of Examples 37-40 optionally include wherein the path quality indication is in a header of the acknowledgement packet.

In Example 42, the subject matter of any one or more of Examples 37-41 optionally include wherein the path quality indication is a single-bit binary value.

In Example 43, the subject matter of any one or more of Examples 37-42 optionally include wherein the path quality indication is a graded value corresponding to a severity of the reported error.

In Example 44, the subject matter of any one or more of Examples 37-43 optionally include wherein the path quality indication is a graded value corresponding to a probability of an error.

In Example 45, the subject matter of any one or more of Examples 37-44 optionally include computing aggregated statistics of a plurality of path quality measures corresponding to respective paths to the destination device.

In Example 46, the subject matter of any one or more of Examples 37-45 optionally include maintaining records that associate path quality information with corresponding paths to a plurality of destination devices.

In Example 47, the subject matter of any one or more of Examples 37-46 optionally include wherein the path selection is made from among a plurality of network fabrics containing paths to the destination device.

In Example 48, the subject matter of any one or more of Examples 37-47 optionally include wherein the path selection is made using dispersive routing wherein the destination device is addressable using multiple different addresses, each address corresponding to a different path.

In Example 49, the subject matter of any one or more of Examples 37-48 optionally include wherein the reported error represents one or more link-layer retries.

In Example 50, the subject matter of any one or more of Examples 37-49 optionally include wherein the reported error represents recovery of data using forward error-correction decoding.

In Example 51, the subject matter of any one or more of Examples 37-50 optionally include wherein the path selection operation is performed by a centralized manager of a network fabric cluster.

In Example 52, the subject matter of any one or more of Examples 37-51 optionally include wherein the originating, receiving and initiating are all performed autonomously by the same machine, the machine being a network node device.

Example 53 is a machine-implemented method for communicating packets in a network, the method comprising: receiving a forward-propagating packet originated from a source device, the forward-propagating packet to be further propagated along a path to a destination device; assessing a measure of path quality based on at least one detected error in communication of one or more packets along the path; and in response to assessment of the measure of path quality, marking the forward-propagating packet with a path quality indication based on the measure of path quality, wherein the path quality indication is to be received by the destination device, and incorporated in an acknowledgement packet directed to the source device; wherein the receiving, assessing, and marking are each performed autonomously by a machine.

In Example 54, the subject matter of Example 53 optionally includes wherein the path quality indication represents a reported error having been previously detected by the method in propagating one or more preceding packets along the path.

In Example 55, the subject matter of any one or more of Examples 53-54 optionally include wherein the path quality indication represents a reported error having been detected by the method in propagating the forward-propagating packet along the path.

In Example 56, the subject matter of any one or more of Examples 53-55 optionally include wherein the path quality indication is in a header of the forward-propagating packet.

In Example 57, the subject matter of any one or more of Examples 53-56 optionally include wherein the path quality indication is in a header of the acknowledgement packet.

In Example 58, the subject matter of any one or more of Examples 53-57 optionally include wherein the path quality indication is a single-bit binary value.

In Example 59, the subject matter of any one or more of Examples 53-58 optionally include wherein the path quality indication is a graded value corresponding to a severity of the at least one detected error.

In Example 60, the subject matter of any one or more of Examples 53-59 optionally include wherein the path quality indication is a graded value corresponding to a probability of an error.

In Example 61, the subject matter of any one or more of Examples 53-60 optionally include maintaining records that associate link quality information with corresponding links to neighboring devices.

In Example 62, the subject matter of any one or more of Examples 53-61 optionally include wherein the error represents one or more link-layer retries.

In Example 63, the subject matter of any one or more of Examples 53-62 optionally include wherein the error represents recovery of data using forward error-correction decoding.

Example 64 is a machine-implemented method for communicating packets in a network, the method comprising: receiving, by a destination node device, a packet having been originated by a source device and forward-propagated along a path from the source device to the destination node device, the path including one or more intermediary node devices; the packet including a path quality indication representing a reported error having been detected by at least one of the intermediary node devices residing along the path, the reported error having been incorporated in the forward-propagating packet by the at least one intermediary device, and in response to receipt of the packet, generating, by the destination node device, an acknowledgement packet directed to the source device, the acknowledgement packet including the path quality indication.

In Example 65, the subject matter of Example 64 optionally includes wherein the path quality indication represents a reported error having been previously detected by the at least one of the intermediary node devices in propagating one or more preceding packets along the path.

In Example 66, the subject matter of any one or more of Examples 64-65 optionally include wherein the path quality indication represents a reported error having been detected by the at least one of the intermediary node devices in propagating the packet along the path.

In Example 67, the subject matter of any one or more of Examples 64-66 optionally include wherein the path quality indication is in a header of the forward-propagating packet.

In Example 68, the subject matter of any one or more of Examples 64-67 optionally include wherein the path quality indication is in a header of the acknowledgement packet.

In Example 69, the subject matter of any one or more of Examples 64-68 optionally include wherein the path quality indication is a single-bit binary value.

In Example 70, the subject matter of any one or more of Examples 64-69 optionally include wherein the path quality indication is a graded value corresponding to a severity of the reported error.

In Example 71, the subject matter of any one or more of Examples 64-70 optionally include wherein the path quality indication is a graded value corresponding to a probability of an error.

In Example 72, the subject matter of any one or more of Examples 64-71 optionally include wherein the reported error represents one or more link-layer retries.

In Example 73, the subject matter of any one or more of Examples 64-72 optionally include wherein the reported error represents recovery of data using forward error-correction decoding.

Example 74 is at least one machine-readable medium comprising: instructions that, when executed by at least one machine having computing and network-interface hardware, cause the at least one machine to: originate a packet to be forward-propagated along a path to a destination device, the path including one or more intermediary node devices; receive a path quality indication in an acknowledgement packet, the path quality indication representing a reported error having been detected by at least one of the intermediary node devices residing along the path, the reported error having been incorporated in the forward-propagating packet by the at least one intermediary device, received by the destination device, and incorporated in the acknowledgement packet; and in response to the path quality indication, initiate a path selection operation to adjust the path to be taken by future packets sourced by the network node device and directed to the destination device.

In Example 75, the subject matter of Example 74 optionally includes wherein the path quality indication represents a reported error having been previously detected by the at least one of the intermediary node devices in propagating one or more preceding packets along the path.

In Example 76, the subject matter of any one or more of Examples 74-75 optionally include wherein the path quality indication represents a reported error having been detected by the at least one of the intermediary node devices in propagating the packet along the path.

In Example 77, the subject matter of any one or more of Examples 74-76 optionally include wherein the path quality indication is in a header of the forward-propagating packet.

In Example 78, the subject matter of any one or more of Examples 74-77 optionally include wherein the path quality indication is in a header of the acknowledgement packet.

In Example 79, the subject matter of any one or more of Examples 74-78 optionally include wherein the path quality indication is a single-bit binary value.

In Example 80, the subject matter of any one or more of Examples 74-79 optionally include wherein the path quality indication is a graded value corresponding to a severity of the reported error.

In Example 81, the subject matter of any one or more of Examples 74-80 optionally include wherein the path quality indication is a graded value corresponding to a probability of an error.

In Example 82, the subject matter of any one or more of Examples 74-81 optionally include instructions for computing aggregated statistics of a plurality of path quality measures corresponding to respective paths to the destination device.

In Example 83, the subject matter of any one or more of Examples 74-82 optionally include instructions for maintaining records that associate path quality information with corresponding paths to a plurality of destination devices.

In Example 84, the subject matter of any one or more of Examples 74-83 optionally include wherein the path selection is made from among a plurality of network fabrics containing paths to the destination device.

In Example 85, the subject matter of any one or more of Examples 74-84 optionally include wherein the path selection is made using dispersive routing wherein the destination device is addressable using multiple different addresses, each address corresponding to a different path.

In Example 86, the subject matter of any one or more of Examples 74-85 optionally include wherein the reported error represents one or more link-layer retries.

In Example 87, the subject matter of any one or more of Examples 74-86 optionally include wherein the reported error represents recovery of data using forward error-correction decoding.

In Example 88, the subject matter of any one or more of Examples 74-87 optionally include wherein the path selection operation is performed by a centralized manager of a network fabric cluster.

In Example 89, the subject matter of any one or more of Examples 74-88 optionally include wherein the originating, receiving and initiating are all performed autonomously by the same machine, the machine being a network node device.

Example 90 is at least one machine-readable medium, comprising: instructions that, when executed by at least one machine having computing and network-interface hardware, cause the at least one machine to: receive a forward-propagating packet originated from a source device, the forward-propagating packet to be further propagated along a path to a destination device; assess a measure of path quality based on at least one detected error in communication of one or more packets along the path; and in response to assessment of the measure of path quality, mark the forward-propagating packet with a path quality indication based on the measure of path quality, wherein the path quality indication is to be received by the destination device, and incorporated in an acknowledgement packet directed to the source device.

In Example 91, the subject matter of Example 90 optionally includes wherein the path quality indication represents a reported error having been previously detected by the at least one machine-readable medium in propagating one or more preceding packets along the path.

In Example 92, the subject matter of any one or more of Examples 90-91 optionally include wherein the path quality indication represents a reported error having been detected by the at least one machine-readable medium in propagating the forward-propagating packet along the path.

In Example 93, the subject matter of any one or more of Examples 90-92 optionally include wherein the path quality indication is in a header of the forward-propagating packet.

In Example 94, the subject matter of any one or more of Examples 90-93 optionally include wherein the path quality indication is in a header of the acknowledgement packet.

In Example 95, the subject matter of any one or more of Examples 90-94 optionally include wherein the path quality indication is a single-bit binary value.

In Example 96, the subject matter of any one or more of Examples 90-95 optionally include wherein the path quality indication is a graded value corresponding to a severity of the at least one detected error.

In Example 97, the subject matter of any one or more of Examples 90-96 optionally include wherein the path quality indication is a graded value corresponding to a probability of an error.

In Example 98, the subject matter of any one or more of Examples 90-97 optionally include instructions for maintaining records that associate link quality information with corresponding links to neighboring devices.

In Example 99, the subject matter of any one or more of Examples 90-98 optionally include wherein the error represents one or more link-layer retries.

In Example 100, the subject matter of any one or more of Examples 90-99 optionally include wherein the error represents recovery of data using forward error-correction decoding.

Example 101 is at least one machine-readable medium, comprising: instructions that, when executed by a machine having computing and network-interface hardware, cause the machine to: receive a packet having been originated by a source device and forward-propagated along a path from the source device to the machine, the path including one or more intermediary node devices; the packet including a path quality indication representing a reported error having been detected by at least one of the intermediary node devices residing along the path, the reported error having been incorporated in the forward-propagating packet by the at least one intermediary device, and in response to receipt of the packet, generate an acknowledgement packet directed to the source device, the acknowledgement packet including the path quality indication.

In Example 102, the subject matter of Example 101 optionally includes wherein the path quality indication represents a reported error having been previously detected by the at least one of the intermediary node devices in propagating one or more preceding packets along the path.

In Example 103, the subject matter of any one or more of Examples 101-102 optionally include wherein the path quality indication represents a reported error having been detected by the at least one of the intermediary node devices in propagating the packet along the path.

In Example 104, the subject matter of any one or more of Examples 101-103 optionally include wherein the path quality indication is in a header of the forward-propagating packet.

In Example 105, the subject matter of any one or more of Examples 101-104 optionally include wherein the path quality indication is in a header of the acknowledgement packet.

In Example 106, the subject matter of any one or more of Examples 101-105 optionally include wherein the path quality indication is a single-bit binary value.

In Example 107, the subject matter of any one or more of Examples 101-106 optionally include wherein the path quality indication is a graded value corresponding to a severity of the reported error.

In Example 108, the subject matter of any one or more of Examples 101-107 optionally include wherein the path quality indication is a graded value corresponding to a probability of an error.

In Example 109, the subject matter of any one or more of Examples 101-108 optionally include wherein the reported error represents one or more link-layer retries.

In Example 110, the subject matter of any one or more of Examples 101-109 optionally include wherein the reported error represents recovery of data using forward error-correction decoding.

Example 111 is a system for communicating packets in a network, the system comprising: means for originating, by a source device, a packet to be forward-propagated along a path to a destination device, the path including one or more intermediary node devices; means for receiving, by the source device, a path quality indication in an acknowledgement packet, the path quality indication representing a reported error having been detected by at least one of the intermediary node devices residing along the path, the reported error having been incorporated in the forward-propagating packet by the at least one intermediary device, received by the destination device, and incorporated in the acknowledgement packet directed to the source device; and means for initiating a path selection operation, in response to the path quality indication, the path selection operation to adjust the path to be taken by future-sourced packets directed to the destination device.

In Example 112, the subject matter of Example 111 optionally includes wherein the path quality indication represents a reported error having been previously detected by the at least one of the intermediary node devices in propagating one or more preceding packets along the path.

In Example 113, the subject matter of any one or more of Examples 111-112 optionally include wherein the path quality indication represents a reported error having been detected by the at least one of the intermediary node devices in propagating the packet along the path.

In Example 114, the subject matter of any one or more of Examples 111-113 optionally include wherein the path quality indication is in a header of the forward-propagating packet.

In Example 115, the subject matter of any one or more of Examples 111-114 optionally include wherein the path quality indication is in a header of the acknowledgement packet.

In Example 116, the subject matter of any one or more of Examples 111-115 optionally include wherein the path quality indication is a single-bit binary value.

In Example 117, the subject matter of any one or more of Examples 111-116 optionally include wherein the path quality indication is a graded value corresponding to a severity of the reported error.

In Example 118, the subject matter of any one or more of Examples 111-117 optionally include wherein the path quality indication is a graded value corresponding to a probability of an error.

In Example 119, the subject matter of any one or more of Examples 111-118 optionally include means for computing aggregated statistics of a plurality of path quality measures corresponding to respective paths to the destination device.

In Example 120, the subject matter of any one or more of Examples 111-119 optionally include means for maintaining records that associate path quality information with corresponding paths to a plurality of destination devices.

In Example 121, the subject matter of any one or more of Examples 111-120 optionally include wherein the path selection is made from among a plurality of network fabrics containing paths to the destination device.

In Example 122, the subject matter of any one or more of Examples 111-121 optionally include wherein the path selection is made using dispersive routing wherein the destination device is addressable using multiple different addresses, each address corresponding to a different path.

In Example 123, the subject matter of any one or more of Examples 111-122 optionally include wherein the reported error represents one or more link-layer retries.

In Example 124, the subject matter of any one or more of Examples 111-123 optionally include wherein the reported error represents recovery of data using forward error-correction decoding.

In Example 125, the subject matter of any one or more of Examples 111-124 optionally include wherein the path selection operation is performed by a centralized manager of a network fabric cluster.

In Example 126, the subject matter of any one or more of Examples 111-125 optionally include wherein the originating, receiving and initiating are all performed autonomously by the same machine, the machine being a network node device.

Example 127 is a system for communicating packets in a network, the system comprising: means for receiving a forward-propagating packet originated from a source device, the forward-propagating packet to be further propagated along a path to a destination device; means for assessing a measure of path quality based on at least one detected error in communication of one or more packets along the path; and means for marking the forward-propagating packet with a path quality indication in response to assessment of the measure of path quality, the path quality indication being based on the measure of path quality, wherein the path quality indication is to be received by the destination device, and incorporated in an acknowledgement packet directed to the source device.

In Example 128, the subject matter of Example 127 optionally includes wherein the path quality indication represents a reported error having been previously detected by the system in propagating one or more preceding packets along the path.

In Example 129, the subject matter of any one or more of Examples 127-128 optionally include wherein the path quality indication represents a reported error having been detected by the system in propagating the forward-propagating packet along the path.

In Example 130, the subject matter of any one or more of Examples 127-129 optionally include wherein the path quality indication is in a header of the forward-propagating packet.

In Example 131, the subject matter of any one or more of Examples 127-130 optionally include wherein the path quality indication is in a header of the acknowledgement packet.

In Example 132, the subject matter of any one or more of Examples 127-131 optionally include wherein the path quality indication is a single-bit binary value.

In Example 133, the subject matter of any one or more of Examples 127-132 optionally include wherein the path quality indication is a graded value corresponding to a severity of the at least one detected error.

In Example 134, the subject matter of any one or more of Examples 127-133 optionally include wherein the path quality indication is a graded value corresponding to a probability of an error.

In Example 135, the subject matter of any one or more of Examples 127-134 optionally include means for maintaining records that associate link quality information with corresponding links to neighboring devices.

In Example 136, the subject matter of any one or more of Examples 127-135 optionally include wherein the error represents one or more link-layer retries.

In Example 137, the subject matter of any one or more of Examples 127-136 optionally include wherein the error represents recovery of data using forward error-correction decoding.

Example 138 is a system for communicating packets in a network, the system comprising: means for receiving, by a destination node device, a packet having been originated by a source device and forward-propagated along a path from the source device to the destination node device, the path including one or more intermediary node devices; the packet including a path quality indication representing a reported error having been detected by at least one of the intermediary node devices residing along the path, the reported error having been incorporated in the forward-propagating packet by the at least one intermediary device, and means for generating an acknowledgement packet directed to the source device in response to receipt of the packet, the acknowledgement packet including the path quality indication.

In Example 139, the subject matter of Example 138 optionally includes wherein the path quality indication represents a reported error having been previously detected by the at least one of the intermediary node devices in propagating one or more preceding packets along the path.

In Example 140, the subject matter of any one or more of Examples 138-139 optionally include wherein the path quality indication represents a reported error having been detected by the at least one of the intermediary node devices in propagating the packet along the path.

In Example 141, the subject matter of any one or more of Examples 138-140 optionally include wherein the path quality indication is in a header of the forward-propagating packet.

In Example 142, the subject matter of any one or more of Examples 138-141 optionally include wherein the path quality indication is in a header of the acknowledgement packet.

In Example 143, the subject matter of any one or more of Examples 138-142 optionally include wherein the path quality indication is a single-bit binary value.

In Example 144, the subject matter of any one or more of Examples 138-143 optionally include wherein the path quality indication is a graded value corresponding to a severity of the reported error.

In Example 145, the subject matter of any one or more of Examples 138-144 optionally include wherein the path quality indication is a graded value corresponding to a probability of an error.

In Example 146, the subject matter of any one or more of Examples 138-145 optionally include wherein the reported error represents one or more link-layer retries.

In Example 147, the subject matter of any one or more of Examples 138-146 optionally include wherein the reported error represents recovery of data using forward error-correction decoding.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A network node device apparatus, the apparatus comprising:
    processing hardware interfaced with a network interface device, the processing hardware to:
        receive a forward-propagating packet originated from a source device, the forward-propagating packet to be further propagated along a path to a destination device, the forward-propagating packet containing data for the destination device rather than being a health packet;
        assess a measure of path quality based on at least one detected error in communication of one or more packets along the path;
        in response to assessment of the measure of path quality, mark the forward-propagating packet with a path quality indication based on the measure of path quality; and
        transmit the forward-propagating packet modified by the path quality indication along the path to the destination device,
    wherein the path quality indication is to be received by the destination device and incorporated in an acknowledgement packet directed to the source device, and
    wherein subsequent use of the network node device as an intermediary between the source and destination devices is dependent on the path quality indication in the acknowledgment packet.

2. The apparatus of claim 1, wherein the path quality indication represents a reported error having been previously detected by the apparatus in propagating one or more preceding data packets along the path independent of whether the forward-propagating packet experiences an error.

3. The apparatus of claim 1, wherein the path quality indication represents a reported error having been detected by the apparatus in propagating the forward-propagating packet along the path.

4. The apparatus of claim 1, wherein the path quality indication is in a header of the forward-propagating packet.

5. The apparatus of claim 1, wherein the path quality indication is in a header of the acknowledgement packet.

6. The apparatus of claim 1, wherein the path quality indication is a single-bit binary value.

7. The apparatus of claim 1, wherein the path quality indication is a graded value corresponding to a severity of the at least one detected error.

8. The apparatus of claim 1, wherein the path quality indication is a graded value corresponding to a probability of an error.

9. The apparatus of claim 1, further comprising:
    a link quality database to maintain records that associate link quality information with corresponding links to neighboring devices.

10. The apparatus of claim 1, wherein the processing hardware is further configured to:
    receive the acknowledgment packet from the destination node;
    avoid altering the adverse path quality indication in the acknowledgment packet independent of whether a change of the measure of path quality has occurred; and
    transmit the acknowledgment packet to the source node.

11. The apparatus of claim 1, wherein the processing hardware is further configured to:
    apply a scoring threshold to determine whether the forward-propagating packet should be marked with the path quality indicator.

12. The apparatus of claim 1, wherein:
    the network node device is a first intermediary device that initially modifies the path quality indication from an initial value to a value indicated by the measure of path quality, the initial value representing an initialized state of the path quality indication.

13. The apparatus of claim 1, wherein the processing hardware is further configured to:

assess the path quality against variable error threshold criteria that is dependent on an expected performance of a network fabric containing the network node device.

14. The apparatus of claim 13, wherein the processing hardware is further configured to at least one of:

increase the error threshold criteria if the fabric is constantly operated at a designed maximum throughput and data rate, or dynamically adjust the error threshold criteria based on a current level of congestion such that greater congestion causes the error threshold criteria to be less sensitive.

15. The apparatus of claim 1, wherein:

the path quality indication represents a reported error having been previously detected by the apparatus in propagating one or more preceding data packets along the path, and a time windowing filter is applied that excludes packet errors that are older than a given time value from consideration for the assessment.

16. The apparatus of claim 15, wherein:

a discount function is applied to reduce severity of a prior error indication as a function of a timestamp of the forward-propagating packet such that more recent errors are given greater weight.

17. The apparatus of claim 1, wherein the processing hardware is further configured to use a broadcast communication to share information regarding the path quality to other nodes, and the broadcast communication is separate from the forward-propagating packet.

18. At least one machine-readable medium, comprising: instructions that, when executed by at least one machine having computing and network-interface hardware, cause the at least one machine to:

receive a forward-propagating packet originated from a source device, the forward-propagating packet to be further propagated along a path to a destination device, the forward-propagating packet containing data for the destination device rather than being a health packet;

assess a measure of path quality based on at least one detected error in communication of one or more packets along the path;

in response to assessment of the measure of path quality, mark the forward-propagating packet with a path quality indication based on the measure of path quality; and transmit the forward-propagating packet modified by the path quality indication along the path to the destination device, wherein the path quality indication is to be received by the destination device and incorporated in an acknowledgement packet directed to the source device, and wherein subsequent use of the network node device as an intermediary between the source and destination devices is dependent on the path quality indication in the acknowledgment packet.

19. The at least one machine-readable medium of claim 18, wherein the path quality indication is a graded value corresponding to a probability of an error.

20. The at least one machine-readable medium of claim 18, wherein the error represents one or more link-layer retries.

* * * * *